United States Patent [19]

Marks et al.

[11] Patent Number: 5,198,527
[45] Date of Patent: Mar. 30, 1993

[54] ARYLCYCLOBUTENE TERMINATED CARBONATE POLYMER

[75] Inventors: Maurice J. Marks; Alan K. Schrock, both of Lake Jackson, Tex.; Thomas H. Newman, Midland, Mich.

[73] Assignee: The Dow Chemical Company, Midland, Mich.

[21] Appl. No.: 894,033

[22] Filed: Jun. 4, 1992

Related U.S. Application Data

[63] Continuation of Ser. No. 633,740, Dec. 24, 1990, abandoned.

[51] Int. Cl.$^5$ .......................................... C08G 64/04
[52] U.S. Cl. .................................. 528/198; 525/462; 528/171; 528/174; 528/196; 528/201; 528/204; 528/480; 528/481
[58] Field of Search ............... 528/198, 196, 201, 204, 528/480, 481, 171, 174; 525/462

[56] References Cited

U.S. PATENT DOCUMENTS

| | | |
|---|---|---|
| 3,600,288 | 8/1971 | Viventi . |
| 3,770,697 | 11/1973 | Holub et al. . |
| 4,026,913 | 5/1977 | Tanigaichi et al. . |
| 4,221,645 | 9/1980 | Adelmann et al. . |
| 4,255,243 | 3/1981 | Coqueugniot et al. . |
| 4,367,186 | 1/1983 | Adelmann et al. . |
| 4,540,763 | 9/1985 | Kirchhoff ........................... 526/261 |
| 4,544,725 | 10/1985 | Priola et al. . |
| 4,622,375 | 11/1986 | Wong ................................. 526/284 |
| 4,638,078 | 1/1987 | Kirchhoff ........................... 558/414 |
| 4,642,329 | 2/1987 | Kirchhoff et al. .................. 526/284 |
| 4,661,193 | 4/1987 | Kirchhoff et al. ................ 156/307.3 |
| 4,667,004 | 5/1987 | Wong ................................. 526/284 |
| 4,667,005 | 5/1987 | Wong ................................. 526/264 |
| 4,698,394 | 10/1987 | Wong ................................. 525/289 |
| 4,708,990 | 11/1987 | Wong et al. . |
| 4,708,994 | 11/1987 | Wong ................................. 525/392 |
| 4,724,260 | 2/1988 | Kirchhoff et al. .................. 546/112 |
| 4,743,399 | 5/1988 | Kirchhoff et al. .................. 252/512 |
| 4,795,827 | 1/1989 | Bruza et al. ....................... 564/329 |
| 4,825,001 | 4/1989 | Bruza et al. ....................... 564/328 |
| 4,864,010 | 9/1989 | Schrock et al. .................... 528/185 |
| 4,912,194 | 3/1990 | Rosenquist ........................ 528/196 |
| 4,937,287 | 6/1990 | Dean . |
| 5,028,690 | 7/1991 | Gallucci . |

FOREIGN PATENT DOCUMENTS

| | | |
|---|---|---|
| 0006578 | 1/1980 | European Pat. Off. . |
| 0092269 | 10/1983 | European Pat. Off. . |
| 0187248 | 7/1986 | European Pat. Off. . |
| 0273144 | 7/1988 | European Pat. Off. . |
| 2757086 | 6/1978 | Fed. Rep. of Germany . |
| 2746139 | 4/1979 | Fed. Rep. of Germany . |
| 3513715 | 10/1986 | Fed. Rep. of Germany . |
| 50-154348 | 12/1975 | Japan . |
| 63-270641 | 11/1988 | Japan . |
| 1-024809 | 1/1989 | Japan . |
| 1-075524 | 3/1989 | Japan . |

OTHER PUBLICATIONS

Huang et al., Polymeric and Monomeric Aryloxy-s--triazines, Polym. Prepr. (Am. Chem. Soc., Div. Polym. Chem., Washington D.C.), 30(1), 348-9, 1989.

Cercena et al., The Use of Aryl Cyanates as Reactive Terminal Groups for Thermally Polymerizable Oligomers, Polymer Prepr. (Am. Chem. Soc., Div. Polym. Chem., Washington D.C.), 25(1) 114, 1984 Abstract/Article.

Sherle et al., Oligomeric Propargyl Carbonates and Polymers Based on Them, Vysokomol. Soedin., Ser. B, 25(10), 783-7, 1983 (USSR) Abstract.

Shashkova et al., Some Properties of Crosslinked Polymers Obtained from Oligocarbonate Methacrylates Having Various Degrees of Oligomerization, Vysokomol. Soedin., Ser A, 28(4), 708-13, 1986 (USSR) Abstract.

Barkalov et al., Radiation-inducing Hardening of Oligocarbonate Methacrylates, Radiats. Khimiya i Tekhnol. Oligomer. Sistem, M. 3-9, Ref. Zh., Khim., 1984, Abstr No. 14S294 (USSR).

Kolesnikov et al., Synthesis and Studies of Crosslinked Polycarbonates, Vysokomol. Soedin., Ser. A, 12(8), 1739-44, 1970 (USSR) Abstract.

Trott, G. F., Surface Modification of Polymer Structures by an Imido-alkylene Substitution Reaction. I. Polycarbonate, J. Appl. Polym. Sci., New York, 18(5) 1411-22, 1974.

Lloyd et al., The Electrophilic Substitution of Benzocyclobutene-II, Tetrahedron, vol. 21, pp. 245-254, (1965).

Lloyd et al., The Electrophilic Substitution of Benzocyclobutene-III, Tetrahedron, vol. 21, pp. 2281-2288, (1965).

Bueche, Physical Properties of Polymers, Interscience Publishers, pp. 225-227 (1962).

Queslel et al., Rubber Elasticity and Characterization of Networks, Comprehensive Polymer Science, Pergamon Press, vol. 2, p. 282.

Andrady et al., Model Networks of End-Linked Polydimethylsiloxane Chains. XII. Dependence of Ultimate Properties on Dangling-Chain Irregularities, Journal of Applied Polymer Science, vol. 26, pp. 1829-1835 (1981).

Primary Examiner—Harold D. Anderson

[57] ABSTRACT

There are disclosed carbonate polymers having terminal arylcyclobutene moieties. Such carbonate polymers are prepared from one or more multi-hydric compounds and have an average degree of polymerization of at least about 2 based on multi-hydric compound. These polymers, including blends thereof, can be easily processed and shaped into various forms and structures according to the known techniques. During or subsequent to the processing, the polymers can be crosslinked, by exposure to heat or radiation, for example, to provide crosslinked polymer compositions. These compositions have a good combination of properties, including for example, processability into shaped articles having unexpectedly good combinations of toughness, solvent resistance, ignition resistance, modulus and resistance to thermal linear expansion.

40 Claims, No Drawings

ARYLCYCLOBUTENE TERMINATED CARBONATE POLYMER

CROSS-REFERENCE TO RELATED APPLICATIONS

This is a continuation of application Ser. No. 653,740, filed Dec. 24, 1990, now abandoned.

This invention relates to novel carbonate polymers having at least one terminal arylcyclobutene moiety. These polymeric compositions are well suited for use in preparing molded articles, composite or blend materials and extruded articles such as sheet or film.

BACKGROUND OF THE INVENTION

There have been many efforts to provide improved combinations of physical properties in carbonate polymers and other engineering thermoplastic resins. For example, in U.S. Pat. No. 4,708,994 it is taught to incorporate reactive arylcyclobutene groups by means of alkylating or acylating aromatic groups of such resins with a molecule containing a reactive arylcyclobutene moiety to provide pendant arylcyclobutene moieties randomly along the polymer backbone. Such resins are then crosslinked and cured during a subsequent heating step and shown to be more solvent and heat resistant. Unfortunately, however, these materials having random and uncontrolled crosslinking throughout the polymer backbone are found to possess generally unsatisfactory combinations of other physical properties such as toughness.

In U.S. Pat. Nos. 4,795,827 and 4,825,001 cyclobutarene ketoaniline monomers are used for attaching cyclobutarene groups to polymers or other molecules having amino-reactive functionalities. However, no arylcyclobutene terminated carbonate polymer compositions are shown. Moreover, carbonate polymers endcapped or terminated with such monomers would not be sufficiently stable for typical engineering thermoplastic applications due to the known thermal instability of the carbamate linkage that would be produced.

SUMMARY OF THE INVENTION

Therefore, in one aspect the invention is a carbonate polymer possessing good combinations of product properties, including toughness, solvent resistance, heat resistance, and thermal stability. According to the present invention there is provided a carbonate polymer prepared from one or more multi-hydric compounds and having an average degree of polymerization of at least about 2 based on multi-hydric compound and having terminal arylcyclobutene moieties. Other embodiments of the invention include such carbonate polymers having an average degree of polymerization of from about 2 to about 100 and carbonate polymers having polymerized therein from about 0.01 to about 1 mole of terminal arylcyclobutene-containing compound per mole of multi-hydric compound.

In another aspect the present invention is a carbonate polymer as described above having terminal arylcyclobutene moieties and having essentially complete arylcyclobutene compound chain termination, preferably having, on the average, at least 2 terminal arylcyclobutene moieties per polymer molecule. A further aspect of the present invention is a carbonate polymer as described above having terminal arylcyclobutene moieties and having less than complete arylcyclobutene compound chain termination. Preferably, where such a polymer has less than complete arylcyclobutene compound chain termination, an arylcyclobutene chain terminating compound and additional chain terminating agent(s) are employed in the preparation of the polymer. In this aspect preferably at least 0.01 mole of an arylcyclobutene chain terminating compound is employed per mole of additional chain terminating agent(s).

The carbonate polymers according to the present invention can be easily handled and melt processed according to the techniques generally utilized with carbonate polymer resins and, when subjected to sufficient crosslinking conditions, result in shaped articles having improved combinations of physical properties such as heat resistance, solvent resistance, toughness and thermal stability. Depending upon the molecular weight of the carbonate polymer and the number of arylcyclobutene moieties present per polymer chain, different properties of the crosslinked or branched carbonate polymers according to the present invention can be optimized and improved. Carbonate polymers having two or more terminal arylcyclobutene moieties per chain and a low degree of polymerization in the pre-crosslinked phase are as easily processed as low molecular weight thermoset resins while providing molded or shaped articles having good mechanical properties which are similar in many respects to high molecular weight linear thermoplastic carbonate polymers. Carbonate polymers having less than two arylcyclobutene units per chain can be used to provide branched carbonate polymers with improved melt processability.

DETAILED DESCRIPTION OF THE INVENTION

Carbonate polymers are well known in the literature and can be prepared by well known techniques. In general, the carbonate polymers can be prepared from one or more multi-hydric compounds by reacting the multi-hydric compound(s) such as a dihydric phenol with a carbonate precursor such as phosgene, a haloformate or a carbonate ester such as diphenyl carbonate. The carbonate polymers can be prepared from these raw materials by an appropriate process selected from one of the known polymerization processes such as the known interfacial, solution or melt processes.

Such carbonate polymers generally possess reoccurring structural units as shown in formula I:

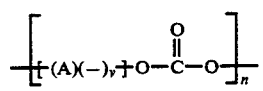

where n is the degree of polymerization: A is a radical having at least 2 valences which is a remnant of a multi-hydric compound, (—) represents valences of A connecting to a carbonate moiety as shown and v is the number of valences of A in excess of 1, an integer greater than or equal to 1. In general A is predominantly a dihydric compound remnant (v is 1) but, if branched polymers are intended, A can include amounts of a tri- or tetra-hydric compound remnant at low levels (v is greater than 1). Dihydric phenols are preferred multi-hydric compounds. The use of a dihydric phenol results in an aromatic carbonate polymer, the most typical of the carbonate polymers. The carbonate polymer molecules are usually terminated with the remnant of a monohydric compound or other monofunctional chain terminating compound.

Such carbonate polymers can be generally represented according to formula II:

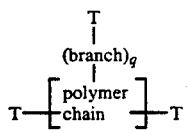

II where T is independently the chain terminating remnant of a monohydric compound or other monofunctional chain terminating compound with or without an arylcyclobutene moiety and q is the average number of polymer chain branches per polymer molecule, preferably from 0 to 0.05. In cases where branched polymer is specifically desired, q is preferably from 0.01 to 0.05.

In the aromatic carbonate polymers of the types which are currently commercially available and most often employed in thermoplastic molding applications, n is usually from about 30 to 315, representing aromatic polycarbonates with weight average molecular weights of from 20,000 to 200,000. See for example, "Polycarbonates", Encyclopedia of Polymer Science and Technology, Vol. 11, p. 648 (1987). However, according to the present invention, where carbonate polymers are prepared with terminal arylcyclobutene moieties and prior to crosslinking, n can advantageously be from 2 to 100. This represents, for example, aromatic carbonate polymer molecular weights (uncrosslinked) of from 500 to 65,000.

In general, the degree of polymerization for a particular carbonate polymer resin according to the present invention depends on the average number of terminal arylcyclobutene moieties per polymer molecule. Carbonate polymers having two or more terminal arylcyclobutene moieties per chain usually become heavily crosslinked to drastically increase the effective molecular weight and provide the desired balance of physical properties. Such polymers need only a low degree of polymerization in the precrosslinked phase. Branched carbonate polymers can be prepared from a carbonate polymer having less than two arylcyclobutene units per chain and a molecular weight within the ranges generally desired for branched carbonate polymers.

Therefore, the precrosslinking degree of polymerization for the carbonate polymers according to this invention can advantageously vary across relatively broad ranges but is at least about 2, preferably greater than about 2, more preferably at least about 2.5, and most preferably at least about 3. The precrosslinking degree of polymerization for the carbonate polymers according to this invention is generally up to about 50, preferably less than or equal to about 35, more preferably less than or equal to about 30, and most preferably less than or equal to about 20.

For aromatic carbonate condensation polymers these degrees of polymerization can be calculated and obtained in accordance with the well known Flory equations, as reproduced below:

$$n=(1+r)/(1+r-2pr) \quad r=X_a/(X_a+2X_t)$$

where n is the degree of polymerization, r is the mole ratio of reactive groups, p is the extent of reaction, $X_a$ is the mole fraction of the dihydric chain extending compound and $X_t$ is the mole fraction of the monohydric chain terminating compound. See P. J. Flory, "Principles of Polymer Chemistry", Cornell Univ. Press, Ithaca, N.Y., p. 92 (1953).

The dihydric phenols which are preferably employed as the multi-hydric compound to provide the aromatic carbonate polymers may contain one or more aromatic rings and contain as functional groups two or more hydroxyl moieties which are reactive with the carbonate precursor compound, each of which hydroxyl moiety is preferably attached directly to a carbon atom of an aromatic ring.

Typical dihydric phenols are 2,2-bis-(4-hydroxyphenyl)-propane ("Bisphenol A"): hydroquinone: resorcinol: 2,2-bis-(4-hydroxyphenyl)-pentane: 2,4'-dihydroxy diphenyl methane: bis-(2-hydroxyphenyl) methane: bis-(4-hydroxyphenyl)-methane; bis(4-hydroxy-5-nitrophenyl)-methane; 1,1-bis-(4-hydroxyphenyl)-ethane: 3,3-bis-(4-hydroxyphenyl)-pentane: 2,2'-dihydroxydiphenyl; 2,6-dihydroxy naphthalene: bis-(4-hydroxypehnyl) sulfone: 2,4'-dihydroxydiphenyl sulfone: 5'-chloro-2,4'-dihydroxydiphenyl sulfone: bis-(4-hydroxyphenyl) diphenyl disulfone; 4,4'-dihydroxydiphenyl ether: 4,4'-dihydroxy-3,3'-dichloro diphenyl ether: and 4,4'-dihydroxy-2,5-diethoxydiphenyl ether. The preferred carbonate polymer is prepared using a dihydric phenol, preferably Bisphenol A, as the multi-hydric compound.

In addition to preparing carbonate homopolymers using a single multi-hydric compound in the process, it is, of course, possible to employ two or more different multi-hydric compounds or a multi-hydric compound in combination with a glycol, a hydroxy terminated polyester, or a dibasic acid in the event a carbonate copolymer or polyester carbonate is desired. Desirably the carbonate copolymers according to the present invention would contain less than about 50, preferably less than about 20, more preferably less than about 10 percent and most preferably less than about 5 percent of an ester linking group. Most preferably the carbonate polymers according to the present invention, insofar as the multi-hydric compounds used, consist essentially of dihydric phenols which contain one or more aromatic rings and contain as functional groups two or more hydroxyl moieties which are attached directly to a carbon atom of an aromatic ring.

It is possible to employ a trihydric and/or tetrahydric phenol compound, as illustrated by the trihydric and/or tetrahydric phenols shown in U.S. Pat. No. 3,544,514, to prepare a randomly branched carbonate polymer which can be provided with terminal arylcyclobutene moieties. The randomly branched chain polycarbonates used in this invention are also well known to those skilled in the art and are prepared by reacting a dihydric compound with phosgene in the presence of a trihydric and/or tetrahydric compound as illustrated in U.S. Pat. No. 3,544,514.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the multi-hydric compound used. The ester interchange is advantageously done at reduced pressures of the order of from about 10 to about 100 millimeters (mm) of mercury.

The backbone chains of all or part of the carbonate polymer molecules prepared as described above are then provided with terminal arylcyclobutene moieties.

With the exception of the terminal arylcyclobutene moieties, it is desirable to avoid arylcyclobutene moieties which are otherwise pendant from the polymer backbone to the extent that their irregular and inconsistent distribution along the polymer molecules detrimentally affects the polymer properties, such as by causing gels or reduced physical properties. Preferably the arylcyclobutene moieties in carbonate polymers according to the present invention consist essentially of terminal arylcyclobutene moieties and more preferably there are essentially no pendant arylcyclobutene moieties. In general an arylcyclobutene terminated carbonate polymer corresponds to the formula III below:

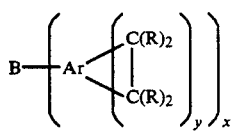

III wherein B is a carbonate polymer, Ar is an aromatic radical which may be substituted with an electron-withdrawing substituent or electron-donating substituent, the carbon atoms represented by C are bonded to adjacent carbon atoms of the aromatic radical Ar, R is independently in each occurrence hydrogen or an electron-withdrawing substituent or electron-donating substituent: x is an integer of 1 or greater, and y is an integer of 1 or greater, preferably 1. For example, a benzocyclobutene-functionalized carbonate polymer according to the present invention corresponds to the following formula IV:

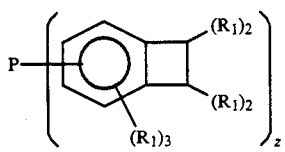

IV wherein P is a carbonate polymer, $R_1$ is independently in each occurrence hydrogen or an electron-withdrawing substituent or electron-donating substituent: z is an integer of 1 or greater. Benzocyclobutene, represented by formula IV above where there is no pendant carbonate polymer and $R_1$ is always hydrogen, is also referred to as bicyclo[4.2.0]-octa-1,3,5-triene.

Providing the backbone chains of all or part of the carbonate polymer molecules with terminal arylcyclobutene moieties can be accomplished by a number of techniques including the use of an arylcyclobutene-functionalized chain terminating compound in a carbonate polymer polymerization reaction or the use of a suitably functionalized arylcyclobutene compound to react with terminally located reactive moieties on an existing carbonate polymer. Compounds suitable for use as chain terminating compounds in carbonate polymerization processes are well known in the literature. Similarly, techniques for preparing arylcyclobutene-containing molecules are well known in the literature, for example U.S. Pat. Nos. 4,540,763 and 4,708,994: both of which are incorporated by reference herein.

The terminal arylcyclobutene moieties are effectively and efficiently incorporated into the carbonate polymers according to the present invention by the use of arylcyclobutene-functionalized chain terminating compounds. In such compounds the arylcyclobutene moieties are located on molecules which react into but terminate the growing carbonate polymer molecules. For example, arylcyclobutene-containing molecules with a single acyl chloride or hydroxy functionality are desirably employed in the carbonate polymer polymerization process. For example, in U.S. Pat. No. 4,540,763 acid chloride functionalized and hydroxy functionalized arylcyclobutene compounds are described. See also Lloyd et al., *Tetrahedron*, vol. 21, pp. 2281–2288, (1965) where hydroxybenzocyclobutene is shown. Hydroxybenzocyclobutene, and particularly 4-hydroxybenzocyclobutene, is a preferable arylcyclobutene-functionalized chain terminating compound for use in preparing the carbonate polymers according to the present invention. 4-Hydroxybenzocyclobutene is also referred to as 3-hydroxy-bicyclo-4.2.0-octa-1,3,5-triene. The hydroxy moiety in hydroxybenzocyclobutene reacts very effectively in the carbonate polymerization process to provide the desired levels of terminal benzocyclobutene moiety.

By controlling the overall and relative amounts of the arylcyclobutene chain terminating compound and any other carbonate polymer terminating compounds employed, the concentration of the arylcyclobutene groups and the molecular weight of the carbonate polymer can be optimized for a particular set of properties. In this way, the total concentration of terminating compound(s) statistically determines the chain length of the carbonate polymer molecules as indicated above where the the Flory equations for this calculation are reproduced. The amount of the arylcyclobutene chain terminating compound relative to the amount of any other chain terminating compound(s) will determine, on the average, what percentage of the carbonate polymer molecule ends will be terminated with an arylcyclobutene moiety and thus the amount of branching that will take place.

In cases where it is desired to have complete arylcyclobutene chain termination in the carbonate polymers, it is clear that the use of any other chain terminating compounds is to be avoided. For linear carbonate polymers, complete arylcyclobutene chain termination means that the polymer molecule is terminated at both ends with the arylcyclobutene moiety and will provide a thoroughly crosslinked polymer composition upon activation of the crosslinking reaction. This situation for linear polymers is represented by formulas III or IV above wherein x or z, respectively, are 2. Carbonate polymers having a relatively low degree of polymerization and complete chain termination with arylcyclobutene moieties are preferred in situations where a processable polymer is desired which has a very low initial melt viscosity prior to crosslinking but which can be easily crosslinked to provide sufficient toughness, solvent resistance and heat resistance.

It should also be noted that branched carbonate polymers can be prepared by the use of branching compounds having three or more hydroxyl groups. This situation is represented by formula I above wherein v is 2 or 3. In these cases the relative concentrations of a chain-terminating arylcyclobutene compounds and any other chain-terminating compounds can be determined to provide the theoretical amount which would be required to provide the desired molecular weight and percentage of chain ends with a terminal arylcyclobutene moiety.

Carbonate polymers having a relatively low molecular weight prior to crosslinking and being completely terminated with all arylcyclobutene terminal groups can be very desirably employed in applications where the molten polymer must flow quickly and easily into a mold, for example, relatively large, complicated molds. Then, upon further heating and crosslinking, in the mold or subsequently, the shaped articles possess good levels of toughness and other properties. It is very unexpected to be able to obtain a readily processable polymer which can be crosslinked to such a high degree and still provide shaped polymer articles which are relatively tough and heat and solvent resistant.

When using a hydroxyl or acyl chloride arylcyclobutene monomer to completely terminate carbonate polymers in an interfacial polymerization process it has been found to be suitable to employ a mole ratio of at least about 0.01 mole arylcyclobutene compound per mole of the multi-hydric compound to obtain the desired carbonate polymer molecular weight. Preferably the mole ratio of the arylcyclobutene compound per mole of the multi-hydric compound is at least about 0.02, more preferably at least about 0.03 and most preferably at least about 0.1. With regard to the maximum levels, it has been found that the mole ratio of the arylcyclobutene compound per mole of the multi-hydric phenol compound is desirably less than or equal to to about 1, preferably less than or equal to 0.99, more preferably less than or equal to 0.5.

For example, when preparing a carbonate polymer in an interfacial-type polymerization process using hydroxybenzocyclobutene, a polycarbonate precursor compound such as phosgene and a dihydric phenolic compound such as bisphenol A, a molar ratio of 1 mole hydroxybenzocyclobutene per mole of dihydric phenolic compound results in a degree of polymerization of 2, based on dihydric compound as calculated by the Flory equations given above and determined prior to the crosslinking of the polymer. A molar ratio of 0.03 mole hydroxybenzocyclobutene per mole of dihydric phenolic compound can be used to obtain a degree of polymerization of 34 when using these compounds to prepare a carbonate polymer which is completely terminated with the arylcyclobutene moiety.

As mentioned above, one embodiment of the present invention includes polymers where less than all of the chain ends are terminated with the arylcyclobutene moiety. Since the arylcyclobutene moieties react with multiple other arylcyclobutene moieties upon activation, the resulting carbonate polymer will be branched around a connecting point of inter-reacted arylcyclobutene moieties. It has been found that very desirable branched carbonate polymers can be provided by this partial crosslinking (i.e., branching) of the carbonate polymer via the arylcyclobutene reaction. In this embodiment of the present invention suitable reactive arylcyclobutene compounds can be reacted onto terminal reactive sites or, more preferably, an arylcyclobutene chain terminating compound is employed in the polycarbonate polymerization process together with one or more other chain terminating compound(s).

With regard to the preparation of aromatic carbonate polymers which are to be branched using the arylcyclobutene moiety and used in applications where the currently available branched resins are utilized, it is desired to obtain resulting branched resins where the molecular weight is in the range of from about 16,000 to about 65,000. Generally such branched polymers can be obtained by the use of chain terminating compound (arylcyclobutene and other) in total amounts in the range of from about 0.04 to about 0.01 mole per mole of multi-hydric aromatic compound. Within this range of chain terminating compound amounts, the desired amount of branching, typically from 0.01 to 0.05 branches per polymer molecule, is then determined by the relative amounts of the arylcyclobutene and other type chain terminating compound which are employed.

For example, to obtain a noticeable effect from the branching it is desirable to use at least 0.01 mole arylcyclobutene chain terminating compound per mole of additional chain terminating agent, preferably at least 0.03 and more preferably at least 0.05 mole arylcyclobutene chain terminating compound per mole of additional chain terminating agent. In general, to obtain desirable branched but not completely crosslinked carbonate polymers, the arylcyclobutene chain terminating compound can be used in amounts of up to about 0.5 moles arylcyclobutene chain terminating compound per mole of additional chain terminating agent, preferably up to about 0.3 and more preferably up to about 0.2 mole arylcyclobutene chain terminating compound per mole of additional chain terminating agent.

The cyclobutene ring of the arylcyclobutene moiety can open by subjecting the functionalized polymers to sufficient heat. Typically, temperatures from about 200° C. to 300° C. are sufficient to open the ring. Polymerization solvents or catalysts are unnecessary, although a copper salt catalyst may lower the required temperature. Electromagnetic radiation, such as microwave, infrared, ultraviolet, electron beam and gamma radiation, may also be used to open the ring, but thermal radiation is preferred since it can be applied by conventional methods.

The carbonate polymers according to the present invention can be employed in mixtures, alloys or blends with other polymer resins, including mixtures with polyester. In addition, other additives can be included in the carbonate polymer of the present invention such as fillers (i.e., glass fibers), pigments, dyes, antioxidants, heat stabilizers, ultraviolet light absorbers, mold release agents, impact modifiers and other additives commonly employed in carbonate polymer compositions.

As can be seen in Table I showing the experiments below, it is quite surprising that the terminal arylcyclobutene moieties provide relatively low molecular weight carbonate polymers with very good combinations of physical properties.

EXPERIMENTS

According to the following procedure, Preparation Method A, Experiment Nos. 2 through 9 were performed, preparing carbonate polymers with the higher levels of benzocyclobutene, benzocyclobutene ("BCB") mole ratios of 0.06 and above.

A glass reactor was fitted with a mechanical stirrer, a baffle, a thermometer, a pH electrode connected to a pH meter/controller, a liquid inlet tube, a gas inlet tube and a gas outlet tube connected to a phosgene scrubber, the scrubber containing an aqueous solution of 50 weight percent sodium hydroxide and about 1 percent by weight triethylamine. To the reactor was added 68.5 weight parts (0.3 mole parts) bisphenol A, 2.16 weight parts (0.018 mole parts) 4-hydroxybenzocyclobutene (BCB-OH), 360 weight parts water and about 240 weight parts dichloromethane.

While stirring the reaction mixture there were added 48 weight parts (0.6 mole parts) of sodium hydroxide in a 50 weight percent aqueous solution followed by the addition of 37 weight parts (0.375 mole parts) of gaseous phosgene at a rate of about 1 weight part per minute. The sodium hydroxide addition was maintained as needed to maintain a pH of about 12.5. Following the phosgene addition, 515 weight parts dichloromethane and 0.3 weight parts (1 mole percent) triethylamine were added. The reaction mixture was agitated for 20 minutes to produce a bisphenol A polycarbonate resin terminated with benzocyclobutene moieties. The pH of the mixture was reduced to about 7 by the addition of 9 weight parts of phosgene. The polymer solution was washed with 1N HCl and with water and the polymer was then isolated.

The polymer molecular weight was determined by gel permeation chromatographic analysis, the weight average molecular weight (Mw) being 18,190. Liquid chromatographic analysis of the reaction mixture residue showed complete reaction of the 4-hydroxybenzocyclobutene. The resulting polycarbonate, before any crosslinking, was therefore determined to contain 0.06 moles benzocyclobutene per mole bisphenol A and have a degree of polymerization of about 27.

This material was compression molded at about 5° F. (307° C.) to form a crosslinked polycarbonate which was completely insoluble in dichloromethane. Differential scanning calorimetry analysis showed a glass transition temperature (Tg) of 165° C. This composition is summarized below in Table I as Experiment No. 2 where further physical properties are shown.

Using the process as described above, a series of arylcyclobutene terminated carbonate polymers having a range of molecular weights and higher arylcyclobutene concentrations were prepared as shown in Experiments 3 through 9 in Table I. In Table I the ratio of the moles hydroxybenzocyclobutene to the moles of bisphenol A is shown as "BCB Mole Ratio." As shown in Table I, varying the amounts of BCB results in the indicated range of polymer compositions and molecular weights. The table shows the correlation between the molecular weight of the resulting polymer (Mw and Mn), the degree of polymerization (n) and the mole ratio of arylcyclobutene to multi-hydric compound. Table I further shows the very desirable property combinations in the resulting crosslinked polymer compositions.

According to the following similar procedure, Preparation Method B, Experiment No. 1 was performed, preparing a carbonate polymer with a BCB Mole Ratio of 0.03, having a lower BCB Mole Ratio and higher molecular weight. To the reactor was added 68.5 weight parts (0.3 mole parts) bisphenol A and 360 weight parts water. With stirring 53 weight parts (0.66 mole parts) of sodium hydroxide in the form of a 50% aqueous solution was added followed by 38 weight parts (0.39 mole parts) phosgene at about 1 weight part per minute. Then 210 weight parts dichloromethane and 1.08 weight parts (0.009 mole parts) 4-hydroxybenzocyclobutene (BCB-OH) were added and the mixture was stirred for 2 minutes. The pH of the mixture was increased to 12.5 with the addition of sodium hydroxide in the form of a 50% aqueous solution and 360 weight parts dichloromethane and 0.10 weight parts (0.001 mole parts) triethylamine were added. The mixture was agitated for 30 minutes with addition of 50% sodium hydroxide aqueous solution to maintain a pH of about 12.5. The pH of the mixture was then reduced to about 7 with addition of 19 weight parts phosgene to produce the BCB terminated polycarbonate. The polymer solution was washed with 1N HCl and with water and then isolated. Gel permeation chromatographic analysis gave a weight average molecular weight (Mw) of 31,967 and liquid chromatographic analysis of the reaction mixture residue showed complete reaction of BCB-OH. The resulting polymer was compression molded at about 585° F. (307° C.) to form a crosslinked polycarbonate which was completely insoluble in dichloromethane (100% gel). Differential scanning calorimetry analysis showed a glass transition temperature (Tg) of 160° C. This composition is summarized below as Experiment No. 1 and further physical properties are shown below in Table I.

For the polymer analysis and evaluations indicated in Table I standard experimental and test methods were used. The Mw and Mn were determined on the uncrosslinked samples by gel permeation chromatographic analysis. The glass transition temperatures (Tg) of these materials were determined by differential scanning calorimetry analysis on samples that had been heated and thus crosslinked at about 350° C.

The tensile testing is performed on 1.6 millimeter (mm), i.e., 1/16 inch, samples that have been compression molded at 307° C. The analyses were performed according to ASTM D-638 on type V sample dimensions. The tensile modulus is shown as "Ten Mod" and the value given in megaPascals (MPa) with the value in kilopounds per square inch (kpsi) being given in parentheses. The stress required to the point of sample yield and sample breaking are shown as "Yield stress" and "Break stress" and the values are given in MPa with the value in kpsi being given in parentheses. The percent of sample elongation at sample yield and sample break are shown as "Yield elong" and "Break elong" with the values shown being the percentages of original sample length that the sample has been elongated. The flexural modulus ("Flex Mod") is tested according to ASTM D-790 and given in MPa with the value in kpsi being given in parentheses.

The notched Izod impact resistance is tested according to ASTM D-256-72A on on 3.18 millimeter (⅛ inch) samples that have been compression molded at 307° C. The results ("N. Izod") are given in Joules per meter (J/m) with the results in foot pounds per inch (ft lb/in) being given in parentheses.

The percent swelling (% Swell) shows the resistance to solvent of the polymer and was measured on 0.254 mm (1/100 inch) film samples soaked in dichloromethane. The indicated results are the percentage increase in the polymer surface area due to solvent absorption. All of the samples were found to be insoluble in dichloromethane.

Thermogravimetric analysis (TGA) is used to measure the char yield ("% Char"), the weight percentage of the residue remaining after heating to 800° C. in air and the decomposition temperature ("Td"), the temperature at which 5% of the sample material is lost. These results show the good thermal stability of the polymers according to the present invention.

The resistance to ignition of the polymer compositions is shown by the Limiting Oxygen Index (LOI) and UL-94 tests performed according to ASTM A-2863-87 and D-4804-88 respectively on 3.18 millimeter (⅛ inch) samples.

The coefficient of linear thermal expansion ("CLTE") is measured according to ASTM D-696 and is reported as a factor of $10^{-5}$ per degree Celsius ($\times 10^{-5}/°C.$) and, in parentheses, as a factor of $10^{-5}$ per degree Fahrenheit ($\times 10^{-5}/°F.$).

The scratch hardness testing ("Hardness") shows the abrasion resistance of the samples and is tested according to ASTM D-3363 with H being the hardest and F, HB, B, 2B and 3B indicating progressively less hardness. As shown, a typical carbonate polymer has a hardness value of about 3B and a hardness value of B is recognized to be significantly better hardness than standard carbonate polymers.

TABLE I

Composition and Property Data

| Experiment No. | PC Control | 1 | 2 | 3 | 4 | 5 | 6 | 7 | 8 | 9 |
|---|---|---|---|---|---|---|---|---|---|---|
| Prep Method | | B | A | A | A | A | A | A | A | A |
| BCB Mole Ratio | 0 | 0.03 | 0.06 | 0.1 | 0.2 | 0.3 | 0.4 | 0.6 | 0.8 | 1 |
| Mw | 30000 | 31894 | 18190 | 11634 | 6057 | 4128 | 3105 | 2088 | 1451 | 1327 |
| Mn | 12000 | 11803 | 6951 | 4518 | 2072 | 1408 | 927 | 718 | 578 | 500 |
| Mw/Mn | 2.50 | 2.70 | 2.62 | 2.58 | 2.92 | 2.93 | 3.35 | 2.91 | 2.80 | 2.65 |
| n (degree of polymer'n) | 34 | 34 | 27 | 11 | 6 | 4.3 | 3.5 | 2.7 | 2.3 | 2 |
| Tg (C) | 150 | 160 | 165 | 170 | 176 | 181 | 180 | 194 | 198 | 207 |
| Ten Mod in M Pa (kpsi) | 1860 (270) | 1950 (283) | 1930 (280) | 2000 (290) | 1960 (285) | 2040 (296) | 2221 (322) | 2262 (328) | 2255 (327) | 2262 (328) |
| Yield stress K Pa (kpsi) | 58.6 (8.5) | 59.3 (8.6) | 61.4 (8.9) | 62.1 (9.0) | 62.1 (9.0) | 66.2 (9.6) | 71.1 (10.3) | 79.3 (11.5) | 82.1 (11.9) | 85.5 (12.4) |
| Yield elong. | 15 | 16 | 15 | 16 | 16 | 16 | 16 | 13 | 13 | 14 |
| Break stress K Pa (kpsi) | 62.1 (9.0) | 55.2 (8.0) | 53.8 (7.8) | 48.3 (7.0) | 49.7 (7.2) | 55.2 (8.0) | 61.4 (8.9) | 75.2 (10.9) | 81.4 (11.8) | 85.5 (12.4) |
| Break elong. | 200 | 111 | 40 | 38 | 31 | 23 | 24 | 16 | 14 | 14 |
| Flex Mod in K Pa (kpsi) | 2660 (386) | — | — | 2430 (352) | — | — | 2640 (383) | — | — | — |
| N. Izod in J/m (ft lb/in.) | 802 (15) | 262 (4.9) | 257 (4.8) | 235 (4.4) | 241 (4.5) | 198 (3.7) | 139 (2.6) | 59 (1.1) | 53 (1.0) | — |
| % Swell CH2CL2 | soluble | 148 | 105 | 64 | 56 | 33 | 39 | 20 | 13 | 18 |
| TGA- % Char | 20 | 20 | — | — | — | — | — | — | — | 27 |
| Td (°C.) | 450 | 450 | | | | | | | | 415 |
| LOI/UL-94 | 27/V-2 | 42/V-0 39/V-0[1] | 42/V-0 | — | — | — | — | —/V-0 | —/V-0 | — |
| CLTE (×10⁻⁵/°C.) (×10⁻⁵/°F.) | 7.1 4.0 | 7.1 4.0 | — | — | — | — | 6.9 3.9 | — | — | — |
| Hardness | 3B | 3B | 2B | 2B | B | HB | HB | F | F | H |

[1]Molded at 200° C. without crosslinking polymer

As can be seen in Table I, a high mole ratio of arylcyclobutene to dihydric phenol produces a carbonate polymer having a low degree of polymerization and a low molecular weight. It should be noted however, that the physical properties of resulting molded articles tested after the crosslinking of the polymer composition are surprisingly good. One skilled in this area of technology would generally expect a polymer that was crosslinked to such a degree to be very brittle and have low impact resistance.

In Experiment 10 the procedures as described for Preparation Method A above were repeated using 0.13 weight parts (0.0011 mole parts) of 4-hydroxybenzocyclobutene and 1.42 weight parts (0.0095 mole parts) of p-tertiary-butylphenol as an additional chain terminating compound. The pre-branching molecular weight (Mw) prior to the activation of the benzocyclobutene bonding was 29,797. The polymer shear sensitivity was determined by measurement of melt viscosities at shear rates between 0.01 and 100 radians per second at 280° C. The shear sensitivity index, R*, is defined as the ratio of the melt viscosities at 1 and 100 radians per second. Among other things, the R* value is an indication of the blow moldability of the polymer, branched polycarbonates being generally recognized as superior in blow molding applications to linear polycarbonate resins. The following Table II compares the properties of the branched polycarbonate according to the present invention with the properties of a linear bisphenol A polycarbonate resin.

TABLE II

Branched Polycarbonate Property Data

| Experiment No. | PC Control | 10 |
|---|---|---|
| BCB Mole Ratio per Mole Dihydric Compound | 0 | .0037 |
| BCB Mole Ratio per Mole Other Chain Terminator | NA | 0.1 |
| Mw | 29,400 | 29,797 |
| n (degree of polymer'n) | 34 | 34 |
| Tg (C) | 150 | 154 |
| R* | 1.27 | 1.64 |

In a further experiment (Experiment 11) the acyl chloride of benzocyclobutene was used to prepare a functionalized polycarbonate. A glass reactor was fitted with a mechanical stirrer, a stirrer baffle, a thermometer, a pH electrode connected to a Fisher Model 805 pH meter/controller, a caustic inlet tube, a phosgene inlet and a gas outlet tube connected to a phosgene scrubber, the scrubber containing an aqueous solution of 50 weight percent sodium hydroxide and about 1 percent by weight triethylamine. The reactor and solvents were thoroughly purged with nitrogen prior to phosgenation. The stirrer was set to give turbulent mixing throughout the vessel. The reactor temperature was maintained below 30° C.

To the reactor as described above was added 68.5 weight parts (0.3 mole parts) bisphenol A, 1.50 weight parts (0.009 mole parts) benzocyclobutene-4-carbonyl chloride (BCB-COCl), 360 weight parts water, and 240 weight parts dichloromethane. With stirring 48 weight parts (0.6 mole parts) of sodium hydroxide in a 50 weight percent aqueous solution were added, followed by the addition of 37 weight parts (0.375 mole parts) phosgene at about 1 weight part per minute. Sodium hydroxide was added to maintain a pH of about 12.5. Then 515 weight parts dichloromethane and 0.30 weight parts (1 mole percent) triethylamine were added.

The mixture was agitated for 20 minutes to produce the BCB terminated polycarbonate. The pH of the mixture was reduced to about 7 with addition of 9 weight parts of phosgene. The polymer solution was washed with 1N HCl and with water and the polymer was then isolated Gel permeation chromatographic analysis gave a weight average molecular weight (Mw) of 32,814 and liquid chromatographic analysis of the reaction mixture residue showed complete reaction of BCB-COCl. The results of this Experiment 11 are shown in Table III below.

TABLE III

| | Acyl Chloride-based Polymer | |
|---|---|---|
| Experiment No. | PC Control | 11 |
| BCB Mole Ratio | 0 | 0.03 |
| Mw | 30000 | 32,800 |
| Mn | 12000 | 10,900 |
| Mw/Mn | 2.50 | 3.02 |
| n (degree of polymer'n) | 34 | 34 |
| Tg (C) | 150 | 166 |
| % swell CH2CL2 | soluble | 225 |

What is claimed is:

1. A carbonate polymer prepared from one or more multi-hydric compounds and having an average degree of polymerization of at least about 2 based on multi-hydric compound and comprising polymerized therein from about 0.01 to about 1 mole of terminal arylcyclobutene-containing compound per mole of multi-hydric compound.

2. A carbonate polymer according to claim 1 having an average degree of polymerization of from about 2 to about 100.

3. A carbonate polymer according to claim 1 having an average degree of polymerization of from about 3 to about 30.

4. A carbonate polymer according to claim 1 comprising polymerized therein from about 0.1 to about 0.5 mole of terminal arylcyclobutene-containing compound per mole of multi-hydric compound.

5. A carbonate polymer according to claim 1 having essentially complete arylcyclobutene compound chain termination.

6. A carbonate polymer according to claim 5 having, on the average, at least 2 terminal arylcyclobutene moieties per polymer molecule.

7. A carbonate polymer according to claim 5 wherein the carbonate polymer is linear and is terminated on both ends.

8. A carbonate polymer according to claim 1 having less than complete arylcyclobutene compound chain termination.

9. A carbonate polymer according to claim 8 wherein the carbonate polymer is linear and has, on the average, less than 2 terminal arylcyclobutene moieties per polymer molecule.

10. A carbonate polymer according to claim 9 wherein the carbonate polymer is linear and has, on the average, less than 1 terminal arylcyclobutene moiety per polymer molecule.

11. A carbonate polymer according to claim 8 wherein an arylcyclobutene chain terminating compound and additional chain terminating agent(s) are employed in the preparation of the polymer.

12. A carbonate polymer according to claim 11 wherein at least 0.01 mole of an arylcyclobutene chain terminating compound is employed per mole of additional chain terminating agent(s).

13. A carbonate polymer according to claim 11 wherein up to about 0.5 mole arylcyclobutene chain terminating compound is employed per mole of additional chain terminating agent(s).

14. A carbonate polymer according to claim 11 wherein from about 0.1 to about 0.5 mole arylcyclobutene chain terminating compound is employed per mole of additional chain terminating agent.

15. A carbonate polymer composition comprising a carbonate polymer according to claim 1 prepared from a aromatic diphenol which aromatic diphenol comprises one or more aromatic rings and comprises as functional groups two or more hydroxyl moieties which are attached directly to a carbon atom of an aromatic ring.

16. A carbonate polymer according to claim 1 prepared by employing an arylcyclobutene-functionalized chain terminating compound in a carbonate polymer polymerization reaction.

17. A carbonate polymer according to claim 1 prepared by the reaction of a suitably functionalized arylcyclobutene compound with terminally located reactive moieties on an existing carbonate polymer.

18. A carbonate polymer composition comprising the product formed by the inter-reaction of terminal arylcyclobutene moieties of a carbonate polymer which carbonate polymer (a) is prepared from one or more multi-hydric compounds and having an average degree of polymerization of at least about 2 based on multi-hydric compound, and (b) comprises polymerized therein from about 0.01 to about 1 mole of terminal arylcyclobutene-containing compound per mole of multi-hydric compound.

19. A carbonate polymer composition according to claim 18 which has arylcyclobutene moieties inter-reacted to crosslink the polymer.

20. A carbonate polymer composition according to claim 18 which has arylcyclobutene moieties inter-reacted to branch the polymer.

21. A carbonate polymer prepared from one or more multi-hydric compounds and having an average degree of polymerization of at least about 2 based on mutli-hydric compound, having terminal arylcyclobutene-containing moieties and having essentially no pendant arylcyclobutene moieties.

22. A carbonate polymer according to claim 21 having an average degree of polymerization of from about 2 to about 100.

23. A carbonate polymer according to claim 21 having an average degree of polymerization of from about 3 to about 30.

24. A carbonate polymer according to claim 21 comprising polymerized therein from about 0.01 to about 1 mole of terminal arylcyclobutene-containing compound per mole of multi-hydric compound.

25. A carbonate polymer according to claim 21 comprising polymerized therein from about 0.1 to about 0.5 mole of terminal arylcyclobutene-containing compound per mole of multi-hydric compound.

26. A carbonate polymer according to claim 21 having essentially complete arylcyclobutene compound chain termination.

27. A carbonate polymer according to claim 26 having, on the average, at least 2 terminal arylcyclobutene moieties per polymer molecule.

28. A carbonate polymer according to claim 26 wherein the carbonate polymer is linear and is terminated on both ends.

29. A carbonate polymer according to claim 21 having less than complete arylcyclobutene compound chain termination.

30. A carbonate polymer according to claim 29 wherein the carbonate polymer is linear and has, on the average, less than 2 terminal arylcyclobutene moieties per polymer molecule.

31. A carbonate polymer according to claim 30 wherein the carbonate polymer is linear and has, on the average, less than 1 terminal arylcyclobutene moiety per polymer molecule.

32. A carbonate polymer according to claim 29 wherein an arylcyclobutene chain terminating compound and additional chain terminating agent(s) are employed in the preparation of the polymer.

33. A carbonate polymer according to claim 32 wherein at least 0.01 mole of an arylcyclobutene chain terminating compound is employed per mole of additional chain terminating agent(s).

34. A carbonate polymer according to claim 32 wherein up to about 0.5 moles arylcyclobutene chain terminating compound is employed per mole of additional chain terminating agent(s).

35. A carbonate polymer according to claim 32 wherein from about 0.1 to about 0.5 mole arylcyclobutene chain terminating compound is employed per mole of additional chain terminating agent.

36. A carbonate polymer according to claim 21 prepared by employing an arylcyclobutene-functionalized chain terminating compound in a carbonate polymer polymerization reaction.

37. A carbonate polymer according to claim 21 prepared by the reaction of a suitably functionalized arylcyclobutene compound with terminally located reactive moieties on an existing carbonate polymer.

38. A carbonate polymer composition comprising the product formed by the inter-reaction of terminal arylcyclobutene moieties of a carbonate polymer which carbonate polymer (a) is prepared from one or more multi-hydric compounds and has an average degree of polymerization of at least about 2 based on multi-hydric compound, (b) has terminal arylcyclobutene-containing moieties and (c) has essentially no pendant arylcyclobutene moieties.

39. A carbonate polymer composition according to claim 38 which has arylcyclobutene moieties inter-reacted to crosslink the polymer.

40. A carbonate polymer composition according to claim 38 which has arylcyclobutene moieties inter-reacted to branch the polymer.

* * * * *